Oct. 18, 1927.
G. H. BUGENHAGEN
1,645,519
SNUBBER FOR AUTOMOBILES
Filed June 9, 1925
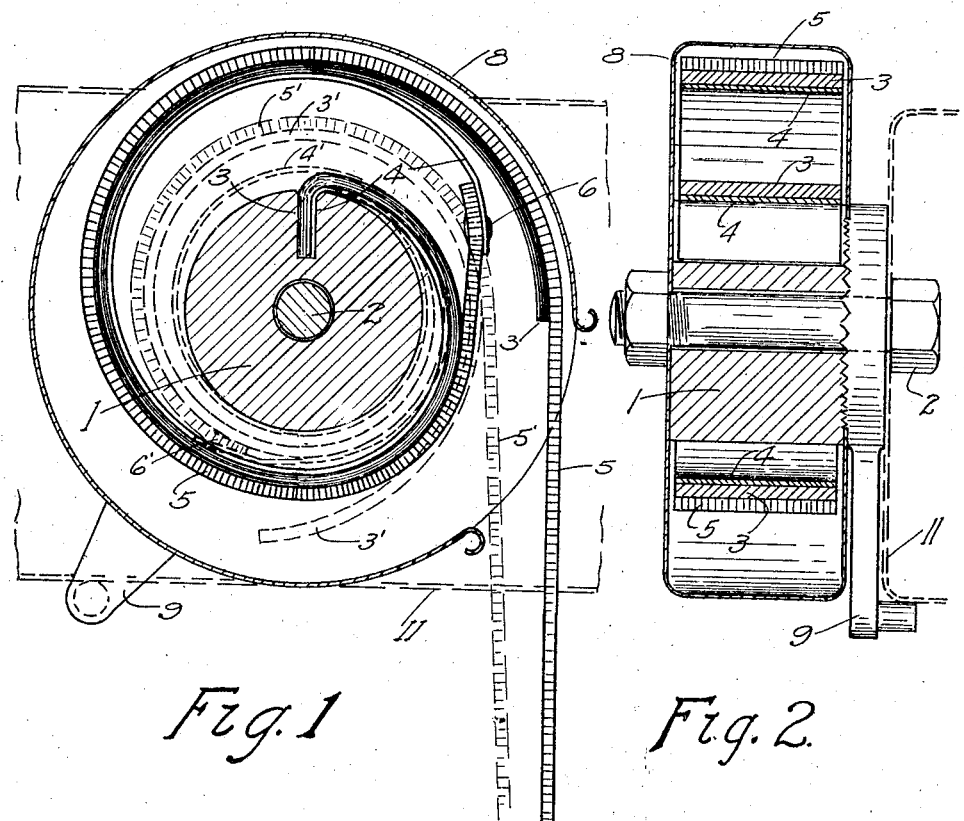
Fig.1  Fig.2
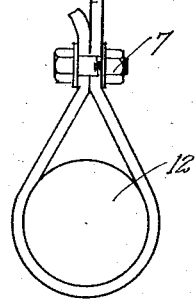
INVENTOR
George Herman Bugenhagen
BY
ATTORNEY Patented Oct. 18, 1927.

1,645,519

UNITED STATES PATENT OFFICE.

GEORGE HERMAN BUGENHAGEN, OF MINOT, NORTH DAKOTA.

SNUBBER FOR AUTOMOBILES.

Application filed June 9, 1925. Serial No. 35,944.

My invention relates to improvements in snubbers for automobiles, or similar vehicles. The object of my improvements are; first, to provide a snubber simple in construction, positive in action and composed of few parts. Second, to provide the required resistance for snubbing by combining frictional resistance on a cushioned brake coil and a coil spring tension. Third, to provide greater resistance on the snubbing stroke and a lesser tension on the recoil stroke.

I attain the objects by the mechanism illustrated in the accompanying drawings, in which;

Fig. 1 is a cross section of the general assembly in a normal positon. Fig. 2 is a transverse section showing the connection to automobile frame.

Similar numerals refer to similar parts thruout the several views.

The part 1 constitutes the fixed hub securely anchored to automobile frame 11 by bolt 2; said hub is held firmly in a fixed position and serves as a base for limiting the contraction of coil springs 3 and 4.

The helical flat coil springs 3 and 4 are hooked into hub 1 at the fixed end as shown and the other ends are free to move in an arc in response to stress applied. The inner spring coil 4 is light and more flexible than the outer spring coil 3 and has fastened to the free end thereof the strap or webbing 5 and supplies the required tension to return the strap to normal position when the snubbing stress is released. Coil spring 3 serves as a braking shoe on which the snubbing web 5 extends in cylindrical surface contact and the said coil spring 3 also acts as a cushion to any sudden jerks applied to the snubbing web 5; it also serves to furnish additional resistance when the inner and more flexible coil spring 4 has been completely coiled up on the hub 1, thus producing a gradual increase in resistance when nearing the end of the stroke, a desirable feature in snubbing devices.

The housing completely encloses the coils 3 and 4 substantially as shown. Bolt 2 fastens the device to frame and stop arm 9 prevents rotation of the hub 1 by its toothed contact.

Referring to numerals 6', 7 and 12 on the drawing, 12 is the axle of a vehicle, 7 is a bolt clamping the snubbing web and 6' is the location that the rivet 6 would be in when the snubbing web is drawn outwardly, or in other words, showing the extent of the forward movement of the web slipping on the surface of the spring coil.

In operation, the web is drawn downwardly and the coil spring 4 contracts in a rotary direction to a typical point 3', Fig. 1. In the same operation the webbing 5 slides on the surface of coil spring 3 producing frictional resistance in addition to the spring tension of coil 4. When the coil spring 4 has been completely coiled up additional extension of the snubbing web is obtained by the coiling of the heavier coil spring 3 and at the same time greatly increases the resistance and cushions the end of the stroke. Any desired extension of strap may be had by proportioning the coils accordingly. The design shown is only typical and I therefore do not confine myself to the specific illustration as shown.

I am aware that snubbers are on the market, but not to my knowledge is my combination used and I therefore claim as follows:

1. The combination in an automobile snubber, of two flat coil springs positioned one within the other in cylindrical contact, adjacent ends of one end respectively in a fixed positon, the opposite ends free to move in a rotating direction, the inner coil spring held in bounds by the outer coil spring. A frictional web connected to the free end of inner, lighter coil spring and slidably mounted on the outer cylindrical surface of the outer, heavier coil spring; the other end of said web extended and connected to axle of vehicle snubbed.

2. The combination in an automobile snubber of two flat coil springs positioned one within the other, in cylindrical contact fixedly anchored at adjacent ends, the other ends being free, a frictional web member operative in conjunction with said free ends; said web in cylindrical surface contact with outer coil spring and connected to free end of inner coil spring, a housing and support for the coil springs.

GEORGE HERMAN BUGENHAGEN.